United States Patent
Bloesch et al.

(10) Patent No.: US 10,523,721 B2
(45) Date of Patent: Dec. 31, 2019

(54) PRESERVING LONG RUNNING SESSIONS DURING SIDE-BY-SIDE UPGRADE

(71) Applicant: Microsoft Technology Licensing, LLC, Redmond, WA (US)

(72) Inventors: Anthony Bloesch, Suzhou (CN); Petru Moldovanu, Redmond, WA (US); Ji Liang, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 456 days.

(21) Appl. No.: 15/187,789

(22) Filed: Jun. 21, 2016

(65) Prior Publication Data

US 2017/0366586 A1    Dec. 21, 2017

(51) Int. Cl.
  *H04L 29/06*    (2006.01)
  *G06F 9/445*    (2018.01)
  *G06F 8/656*    (2018.01)

(52) U.S. Cl.
  CPC .......... *H04L 65/1083* (2013.01); *G06F 8/656* (2018.02)

(58) Field of Classification Search
  CPC ......... H04L 65/1083; G06F 8/656; G06F 8/60
  See application file for complete search history.

(56) References Cited

U.S. PATENT DOCUMENTS

| | | | |
|---|---|---|---|
| 7,523,453 B2 | 4/2009 | Allen | |
| 7,953,861 B2 | 5/2011 | Yardley | |
| 7,970,901 B2 | 6/2011 | Lipscomb et al. | |
| 8,140,644 B2 | 3/2012 | Hagale et al. | |
| 8,370,467 B1* | 2/2013 | Sauer | H04L 69/02 709/217 |
| 8,560,694 B2* | 10/2013 | Keller | G06F 9/44536 709/226 |
| 9,805,051 B2* | 10/2017 | Bergner | G06F 16/178 |
| 2009/0198769 A1* | 8/2009 | Keller | H04L 67/34 709/203 |
| 2010/0269121 A1* | 10/2010 | Montesissa | G06F 8/656 719/313 |

(Continued)

OTHER PUBLICATIONS

Bergenholtz, Erik, "WebLogic Server Side-by-Side Deployment", Published on: Mar. 9, 2011 Available at: https://www.youtube.com/watch?v=ufRK29cLW9U, 1 page.

(Continued)

*Primary Examiner* — Abdullahi E Salad

(57) ABSTRACT

The present disclosure is directed to preserving running sessions during a side-by-side upgrade of system resources. Example aspects include deploying a first version and a second version of a system resource to a server within a network, the first version and the second version of the system resource both maintained within the system network and accessible via a version agnostic Application Programming Interface. Example aspects can receive, at a front-end server, a request for interaction with the system resource from a first client system, the request from the first client system including a header including version-identifying information. The systems and methods can determine, at a session version redirector, that the client system should be provided the first version and not the second version based on the version-identifying information in the header.

19 Claims, 9 Drawing Sheets

(56) References Cited

U.S. PATENT DOCUMENTS

| | | | |
|---|---|---|---|
| 2014/0067780 A1* | 3/2014 | Lipscomb | G06Q 30/0601 707/695 |
| 2014/0086399 A1 | 3/2014 | Haserodt et al. | |
| 2014/0149485 A1 | 5/2014 | Sharma et al. | |
| 2014/0282468 A1 | 9/2014 | Millett et al. | |
| 2015/0046915 A1 | 2/2015 | Oliver et al. | |
| 2016/0140148 A1* | 5/2016 | Raffo | H04L 41/0859 707/803 |

OTHER PUBLICATIONS

"Redeploying Applications in a Production Environment", Published on: Feb. 25, 2013 Available at: https://docs.oracle.com/cd/E13222_01/wls/docs100/deployment/redeploy.html, 9 pages.

"Upgrade Insecure Requests", Published on: Oct. 8, 2015 Available at: https://www.w3.org/TR/upgrade-insecure-requests/, 36 pages.

"Preserving Session State in Network Load Balancing Web Server Clusters", Published on: Jul. 16, 2011 Available at: https://technet.microsoft.com/en-us/library/cc781149(v=ws.10).aspx, 1 page.

"Creating and Managing User Sessions", Published on: Jul. 24, 2012 Available at: https://docs.oracle.com/cd/E19644-01/817-5451/dwsessn.html, 23 pages.

"Preserving Session State in Network Load Balancing Web Server Clusters (IIS 6.0)", Retrieved on: Feb. 5, 2016 Available at: https://www.microsoft.com/technet/prodtechnol/WindowsServer2003/Library/IIS/77cb4318-75f8-4310-a05f-3605b5768007.mspx?mfr=true, 1 page.

\* cited by examiner

PRESERVING LONG RUNNING SESSIONS DURING SIDE-BY-SIDE UPGRADE

BACKGROUND

Enterprise customers prefer highly stable platforms to run their mission-critical infrastructure. They also prefer platforms that are regularly and rapidly updated with improved features. However, rapid updates often come with a cost: upgrade too rapidly and risk introducing platform instability, bugs, or security loopholes. Rapid upgrades may also risk being incompatible with client devices or software thereby potentially interrupting the user experience and in particular, the experience of those engaged in long running sessions.

A user may have a session running for days or weeks. If any part of an enterprise platform is upgraded during that time, existing sessions may fail or the user may encounter unexpected delays in opening new sessions. For example, the user may experience some parts of the system failing to load versionable resources (e.g. asychnronously loaded JavaScript files) or those system resources that have been loaded may display incorrect user state or information, content information, list entries, or system information. Furthermore, if system traffic is directed to the new system resource versions, the users could experience a complete compatibility failure whereby the user is unable to perform any platform activity. In a worst case scenario, the user may experience a permanent loss of data or an irreparable corruption of critical information.

Accordingly, some users forgo the benefits of rapid and regular updates to avoid the inconvenience of interrupted user experiences or the permanent dangers that come with the loss or corruption of crucial data and information.

It is with respect to these and other general consideration that aspects of the present disclosure have been made. Additionally, although relatively specific problems are discussed, it should be understood that the aspects should not be limited to solving only the specific problems identified in the background.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first aspect, a system for preserving running sessions during side-by-side upgrade is disclosed. The system includes one or more processors and a memory coupled to the one or more processors. The memory stores a session preservation application comprising computer-executable instructions. When executed by the one or more processors, the instructions cause the system to deploy a first version and a second version of a system resource to a server within a network, wherein the first version and the second version of the system resource are both maintained within the system network and accessible via a version agnostic Application Programming Interface, the second version of the system resource being updated relative to the first version. The instructions further cause the system to receive, at a front-end server, a request for interaction with the system resource from a first client system, the request from the first client system including a header including version-identifying information; determine, at a session version redirector, that the client system should be provided the first version of the system resource and not the second version of the system resource based on the version-identifying information in the header; and in response to the request from the first client system, provide the first version of the system resource to the first client system.

In a second aspect, a computer-implemented method for preserving running sessions during side-by-side upgrade is disclosed. The method includes receiving, at a front-end server, a first request from a client system for interaction with a system resource hosted at a server within a server network. The method also includes providing a first version of the system resource to the client system, and deploying a second version of the system resource to a server within the system network, such that the first version and the second version of the system resource are both maintained within the system network, the second version of the system resource being updated relative to the first version. The method also includes receiving, at the front-end server, a second request for interaction with the system resource from the client system, the request from the client system including a header including version-identifying information, and determining, at a session version redirector, that the client system should be provided the first version of the system resource and not the second version of the system resource based on the version-identifying information in the header. The method further includes, in response to the request from the first client system, providing the first version of the system resource to the first client system.

In a third aspect, a computer-readable storage medium encoded with computer-executable instructions is disclosed. When executed by a computer, the instructions cause the computer to receive, at a front-end server, a first request from a client system for interaction with a system resource hosted at a server within a server network; provide a first version of the system resource to the client system; and deploy a second version of the system resource to a server within the system network, such that the first version and the second version of the system resource are both maintained within the system network. The instructions further cause the computer to receive a second request for interaction with the system resource from the client system; determine, at a session version redirector, that the client system has an existing session associated with the first version of the system resource; and in response to the second request, provide the first version of the system resource to the client system.

DETAILED DESCRIPTION

Figure 1:
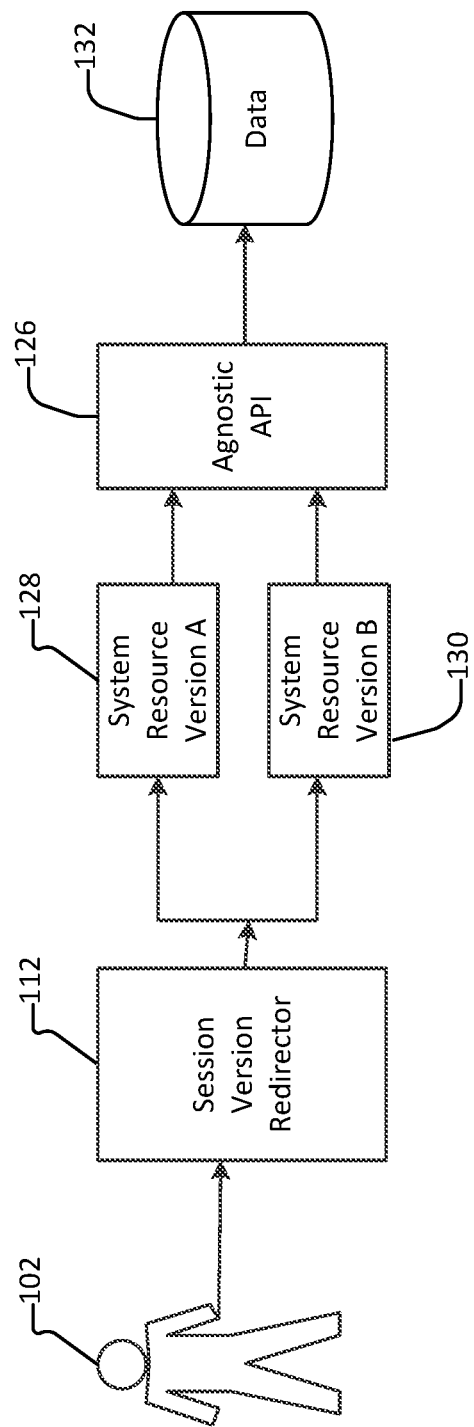
FIG. 1 illustrates a schematic diagram of a session version redirector useable in accordance with the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In accordance with the present disclosure, it is recognized that platform users often have long-running interactive sessions. If any part of an enterprise platform is upgraded during that time, any existing sessions may fail or the user associated with such a session may encounter unexpected delay in opening new sessions. For example, the user may experience some parts of the system failing to load versionable resources (e.g. asychnronously loaded JavaScript files) or those system resources that have been loaded may display incorrect user state or information, content information, list entries, or system information. Furthermore, if system traffic is directed to the new system resource versions, the user could experience a complete compatibility failure whereby the user is unable to perform any platform activity. In a worst case scenario, the user may experience a permanent loss of data or an irreparable corruption of critical information.

To address this problem, the present disclosure is directed generally to enabling a side-by-side upgrade in a manner that preserves such long running sessions. Preserving long running sessions during side-by-side upgrades is achieved, in example aspects, by providing version agnostic Application Programming Interfaces (APIs), older versions of system resources, upgraded version of system resources, and a session version redirector that can direct traffic appropriately to either older versions or newer version of system resources. Accordingly, aspects disclosed herein provide users with the ability to experience the benefits of rapidly upgraded features while also retaining the security and stability that comes with proven, older versions of enterprise resources.

In example aspects of the present disclosure, the session version redirector is able to carry out testing of new resource features by directing test traffic to the upgraded version of system resources and establishing security and stability baselines of the upgraded version of system resources. If the test traffic proves unhealthy, for example, with instability, bugs, security compromises, or incompatibility with client resources, then the session version redirector is able to rollback traffic back to older versions of system resources.

FIG. 1 illustrates a schematic diagram of a session version redirector 112, useable in accordance with the present disclosure. FIG. 1 illustrates a user 102 accessing a session version redirector 112. In general, the user 102 corresponds to a user at a computing system (such as any of the systems described below) who may wish to access system resources, for example via a network connection. The user 102 will send requests to a remote system that hosts the session version redirector 112. The session version redirector 112 directs a user request to a system resource version—for example, system resource version A 128 or system resource version B 130. In such an arrangement, the system resources 128, 130 can be, for example, web pages or other data interfaces having a particular interactive characteristic, and presenting data managed by a system that implements a version agnostic API 126 useable to access data 132. In an example embodiment, session version redirector 112 can be an independent module or an extension of an existing component, such as IIS URL Rewrite module provided by Microsoft Corporation of Redmond, Wash. The session version redirector 112 may direct requests or traffic by a plurality of means (e.g. modifying response headers or a request pipeline). Regardless, the system version redirector 112 ensures that the user request is routed to the correct version of the system resource 128, 130, which ultimately interacts with the version agnostic API 126 to access data 132. Accordingly, the request is ultimately routed to the appropriate version of a system resource, which utilizes version agnostic API 126 to handle the request and provide the data 132 for integration with the appropriate system resource for delivery to user 102, as appropriate.

Figure 2:
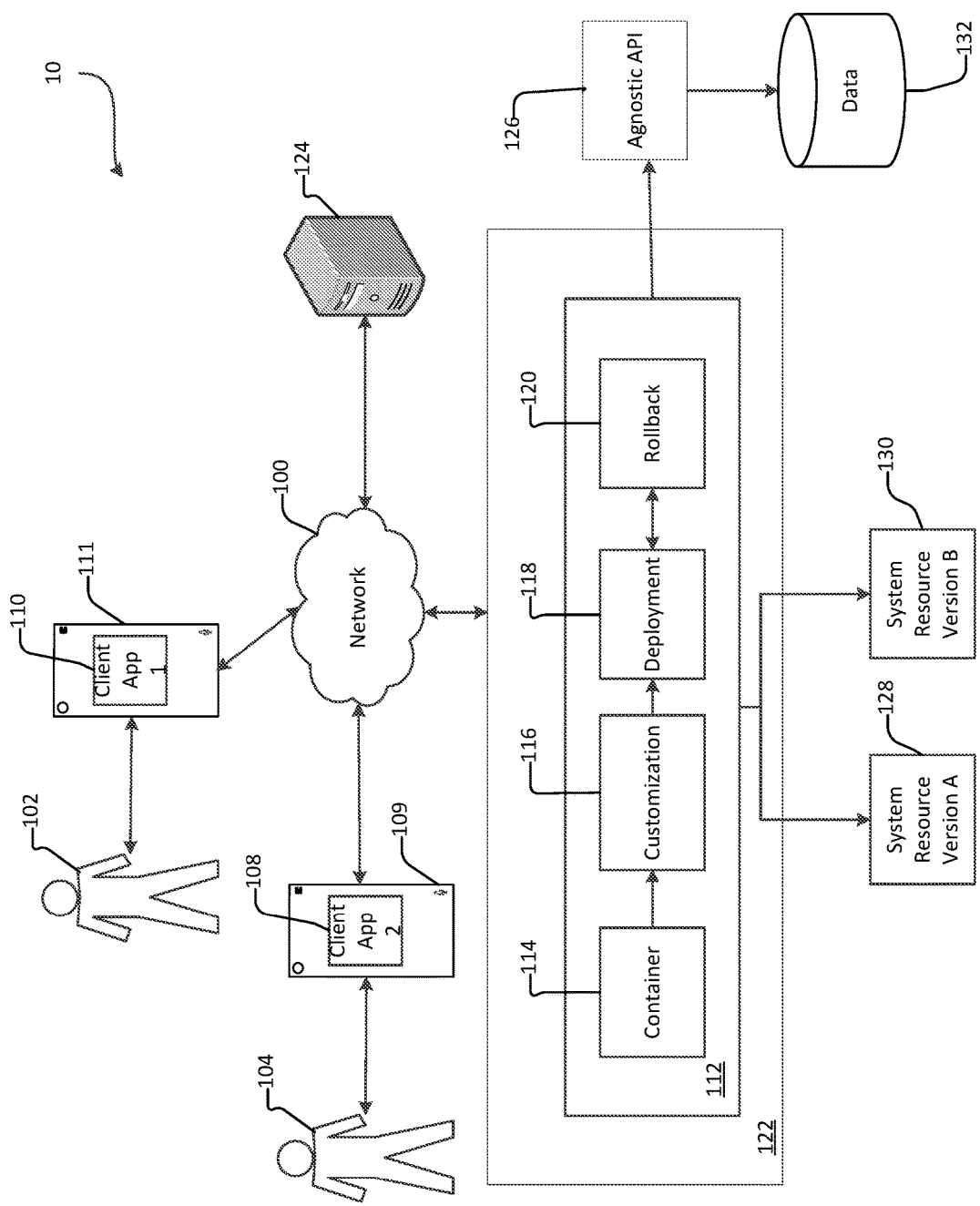
FIG. 2 illustrates a schematic block diagram of a network running a session version redirector, according to an example embodiment of the present disclosure.

FIG. 2 illustrates a schematic block diagram of an example network arrangement 10 in which a session version redirector 112 is implemented according to an example embodiment. This embodiment, as shown, corresponds to a more particular example of the arrangement 10 of FIG. 1, providing additional detail regarding the system version redirector 112.

In the embodiment shown, the network arrangement 10 includes a client application 110 on one or more user computing devices 111, such as for example, a mobile phone, a tablet computing device, or a laptop or desktop computer, examples of which are provided below in conjunction with FIGS. 6, 7A and 7B. A user 102 may use the client application 110 to access various local and remote resources, and in some cases, access session-based services provided by a server 124. In the example shown, the client application 110 is connected to a server 124 via the network 100, for example via the internet or a local area network. The server 124 hosts a platform 122 including a plurality of system resources that can be provided to the client application 110. The plurality of system resources can include, for example different versions of the same system resource, with one of those system resources being an updated version of another version of the system resource. The updated version of the system resource may, for example, have changed functionality as compared to the previous version, for example regarding how data 132 is accessed, calculated, integrated with the resource, or presented to a user, and therefore different versions may have different operational characteristics. The enterprise platform 122 has a session version redirector 112 that provides each user session with a consistent version of system resources during a session with the server 124 to ensure continued, consistent operation with the enterprise platform 122 from the perspective of the client application 110.

In the embodiment shown, the session version redirector includes several modules, such as, for example a container module 114, a customization module 116, a deployment module 118, and a rollback module 120. Details regarding such modules are provided in greater detail below.

Aspects described herein are directed to providing a user with the ability to enter an API call to the appropriate system resource (e.g. system resource version A or system resource version B). In one aspect, the platform 122 acts as session-based front-end server that accesses system resources from server 124, which may represent one or more servers hosting a plurality of different services. In an example embodiment, the enterprise front-end server 122 can be a SharePoint server-side services provided by Microsoft Corporation of Redmond, Wash. In another example embodiment, the client application 110 engages with a session version redirector 112 located remotely on a platform 122 on server 124. This may be, for example, a session version redirector 112 located remotely on a remote installation services (RIS) network or as a smart function of a load balancer on a network. In yet another aspect, the client application 110 engages with a session version redirector 112 that is located locally on a software or application 122 (e.g. on the operation system (OS) or as a function of the client application 110) on one or more client devices. For example, the session version redirector 112 may be part of an application running in the background of an operating system and is only called when the user call specific functions or programs to a system resource version.

As further illustrated in FIG. 2, the session version redirector 112 can call specific programs or functions using, for example, an agnostic API 126. The agnostic API 126 is compatible with a plurality of versions of a given system resource, and can engage with a database 132 despite whichever version the session version redirector 112 chooses (from among the compatible versions). For example, the agnostic API 126 can be compatible with a current version of the system resource and a previous version or versions of the same system resource. The session version redirector 112 also allows traffic to be directed to either system resource versions, thereby providing data integration with any version of system resources that may be available on the platform 122.

As will be described in further detail herein, the session version redirector 112 is a tool that allows traffic to be directed to an appropriate system resource version, such as system resource version A 128 or system resource version B 130. How system traffic is directed is based at least in part on the functions of container module 114, the customization module 116, the deployment module 118, and the rollback module 120. The session version redirector 112 further direct traffic to the agnostic API 126, which is compatible with the functions or programs in either system resource version A 128 or system resource version B 130. Additionally, the session version redirector 112 can create a test trial to assess the stability of any updates or changes made in the customization module 116 to a system resource version. If traffic to a system resource version A 128 or system resource version B 130 is unhealthy or results in undesirable outcomes, such as, for example compatibility or stability issues, the session version redirector 112 can direct traffic back to another system resource version. Session version redirector 112 uses the rollback module 120 to direct traffic to another system resource version. By directing traffic back to a different system resource version, the session version redirector 112 allows users to preserve long running sessions without fear of interrupting sessions during side-by-side upgrades. Unhealthy or incompatible traffic is directed to a compatible system resource version that minimizes the loss of crucial information, which allows users to safely run their mission-critical infrastructure.

In the embodiment shown the container module 114 executes a container image that stores a generalized contained version of the system resource to be deployed at the server. The containers used can be, for example Windows Server Containers (WSC) images from Microsoft Corporation of Redmond, Wash. The customization module 116 can apply one or more customizations to the deployed resource, for example to customize a SharePoint application for specific use by a particular user or application. The customizations include any custom SharePoint solutions and applications at the server or the network including the server. The deployment module 118 applies a deployment layer, including a location of a configuration database within the network, and subsequently deploys, or publishes the particular customized resource at the server so that the session version redirector 112 can begin directing requests for a system resource to that new module. The rollback module 120 can halt redirection of traffic to the new image if the health of the network is adversely affected, if there are issues with execution of the new version, or based on direction from an administrator.

In the context of the present disclosure, and as briefly discussed above, system resource version A and system resource version B may be resources designated for client applications 110 on a client device 111 or from a network 100 running on a server 124. Such system resource version may also refer to, for example, resources for applications that are provided on a platform 122. Such examples include a phone application, an internet browser application, an email application, a document management application, a file and data management application, a note taking application, a text messaging application, a calendar application, a visual presentation application, a camera application, a map application, etc. Accordingly, third party applications may also use system resource version to execute programs or functions that are part of the third party applications.

In yet another example embodiment, system resource version B 130 may be an updated or customized version of system resource version A 128. System resource version B 130 may contain new or different features and functionality. In another aspect, system resource version B 130 may also retain core features and functionality of system resource version A 128 but the stability and security of the new or different features and functionality have not yet been exhaustively tested.

Both system resource version A 128 and system resource version B 130 may be concurrently available for a user. The session version redirector 112 direct traffics to either system resource version based at least in part on the functions of container module 114, the customization module 116, the deployment module 118, and the rollback module 120. In an example embodiment, a user 102 runs a client application 110 on a client device 111. The user 102 uses the client application 110 to access various system resources on a platform 122 on network 100 provided by a server 124. The user 102 sends a request to the platform 122 to interact with a system resource. The session version redirector 112, based at least in part on the container module 114, the customization module 116, the deployment module 118, and the rollback module 120, directs traffic to system resource version A 128.

If the user 102 then sends a second request to platform 122 to interact with a system resource, the session version redirector 112 will determine if the user 102 has an existing session associated with system resource version A 128. If so, session version redirector 112 will direct traffic from the second request to the system resource version A 128, due to that existing session. By directing traffic back to the same system resource version, the session version redirector 112 allows user 102 to preserve long running sessions. This approach minimizes the risk of interruption, incompatibility, instability, or the loss of crucial information. This allows user 102 to run mission-critical infrastructure on highly stable platform 122.

Conversely, if a second user 104 uses a client application 108 on a client device 109 to access session-based services provided on a platform 122, the session version redirector 112 can determine if the second user 104 has an existing session associated with system resource version A 128. In some embodiments, if the session version redirector 112 determines that the second user has no current sessions with system resource version A, the session version redirector 112 can direct traffic for any future sessions associated with that second user to the system resource version B 130, which may perhaps be an updated, improved system version resource. Alternatively, if the session version redirector 112 identifies two current sessions associated with the second user, one of which was implemented prior to update of the system resource, that older session may use system resource version A, while the later session could use system resource version B. Preferably, the session version redirector 112 identifies sessions based on information received from the client application 108, and therefore need not track sessions at the server itself, but rather can rely on session and/or resource version information provided by that client application 108. Generally, the session version redirector 112 allows traffic to be directed to a compatible, and in certain circumstances, newer and more updated system resource versions. Thus, the second user 104 enjoys the most up-to-date experience with platform 122 and experiences the benefits that come with rapidly updated features and functionality, even if that second user accesses the platform before the first user's access session is complete.

Figure 3:
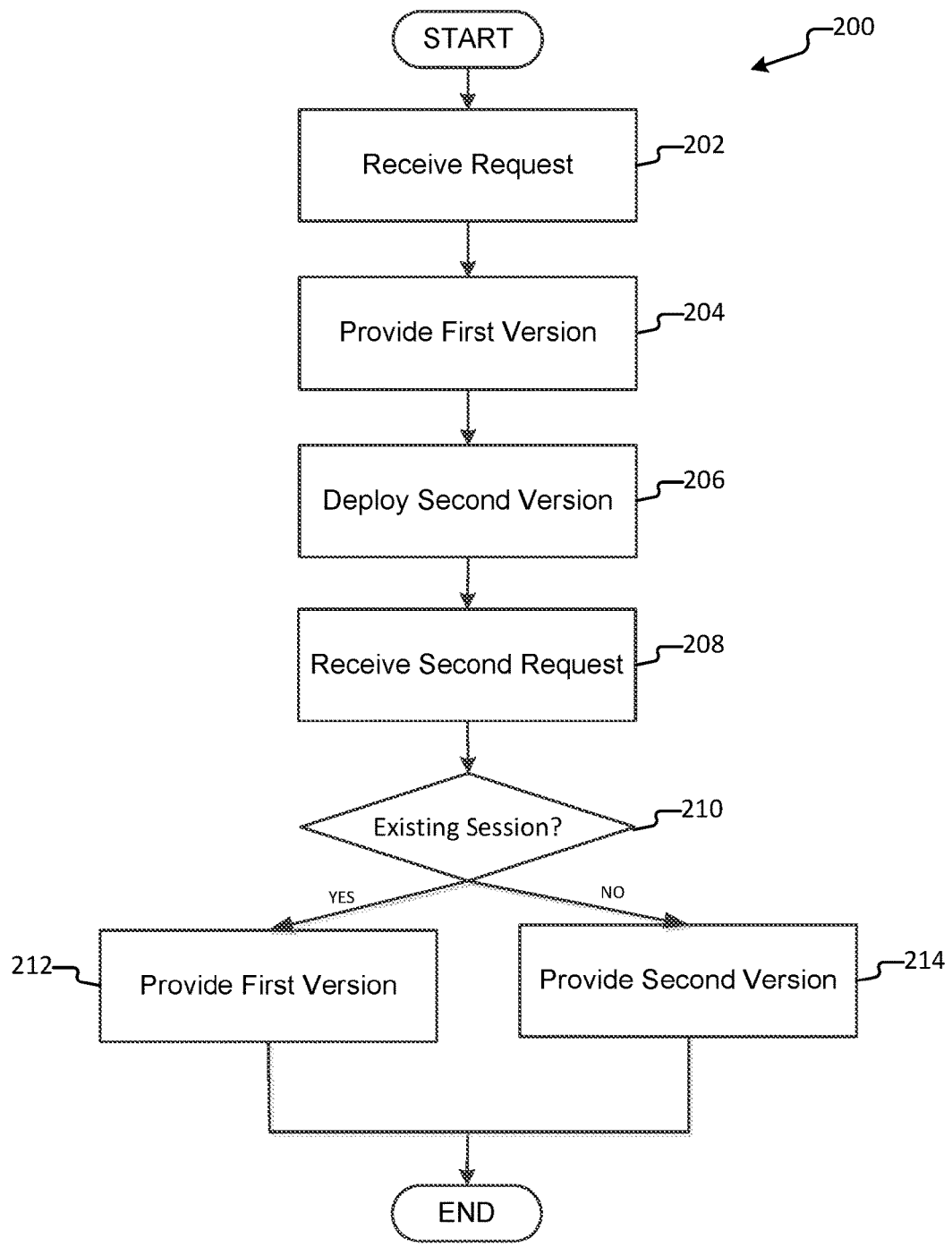
FIG. 3 illustrates a flowchart of a method for preserving a resource used in a session in view of side-by-side upgrades, according to an example embodiment of the present disclosure.

FIG. 3 illustrates a flowchart of a method 200 for preserving a resource used in a session in view of side-by-side upgrades, according to an example embodiment of the present disclosure. The method 200 generally can be performed within the network arrangement 10 of FIGS. 1-2, or analogous systems.

In the embodiment shown, the method 200 includes receiving a request for a system resource at a server (step 202). The request can be received at a front-end computing system that includes various interface services useable to deliver data and resources that consume such data to a client system, for example for use within a browser or application program. Such a system may implement SharePoint server-side services provided by Microsoft Corporation of Redmond, Wash. The request can be a request for a first version of the system resource, and may include, for example, metadata (e.g., in a HTTP header) describing a particular version of that system resource in use by the client system, for example to ensure consistent operation from the perspective of that client system. In the embodiment shown, the method further includes providing the first version of the system resource to the client system in accordance with the request (step 204).

In the embodiment shown, a second version of the system resource is deployed at the server (step 206). The second version of the system resource is then managed at the server concurrently with the first version of the system resource. The second version of the system resource can be an updated version of the system resource having different operation or functionality as compared to the first version, but both being capable of accessing and consuming data from a database via a version-agnostic API, as noted above. A session version redirector 112 can be used to route sessions appropriately to the first and second versions of the system resource.

In the embodiment shown, a second request is received at the server (step 208). The second request can be a request from the same user system or a different user system. In some cases, the second request can be from the first user system or other user who was previously using the first version of the system resource, and having an existing session in progress. In such cases, it may be desirable to continue to provide the first version of the system resource to the user to ensure consistent operability and reliability of the client, which may expect data in a particular format. In some other cases, the second request can be from an entity not having an existing or long-lasting session in progress, in which case it can be assumed that the user does not require use of an older version of a system resource for purposes of maintaining operability or reliability.

An existing session determination (step 210) assesses whether the second request is received from a user having an existing, long lasting session. This can occur in any of a number of ways. For example, in some embodiments, the second request can include an identifier of a version of a system resource being requested included in that request, for example in metadata associated with the request. If the user has an existing session, the server may note that the user is requesting a previous version of the system resource (e.g., the first version) based on information in the request, and will return the first version of the resource (step 212). If the user does not have an existing session, the server may note that the user is requesting a current version of the system resource, and may be provided either the first or second version of the resource (step 214) depending upon administrator preferences (e.g., as based on stability, error rates, usability features of the newer version of the system resource).

Figure 4:
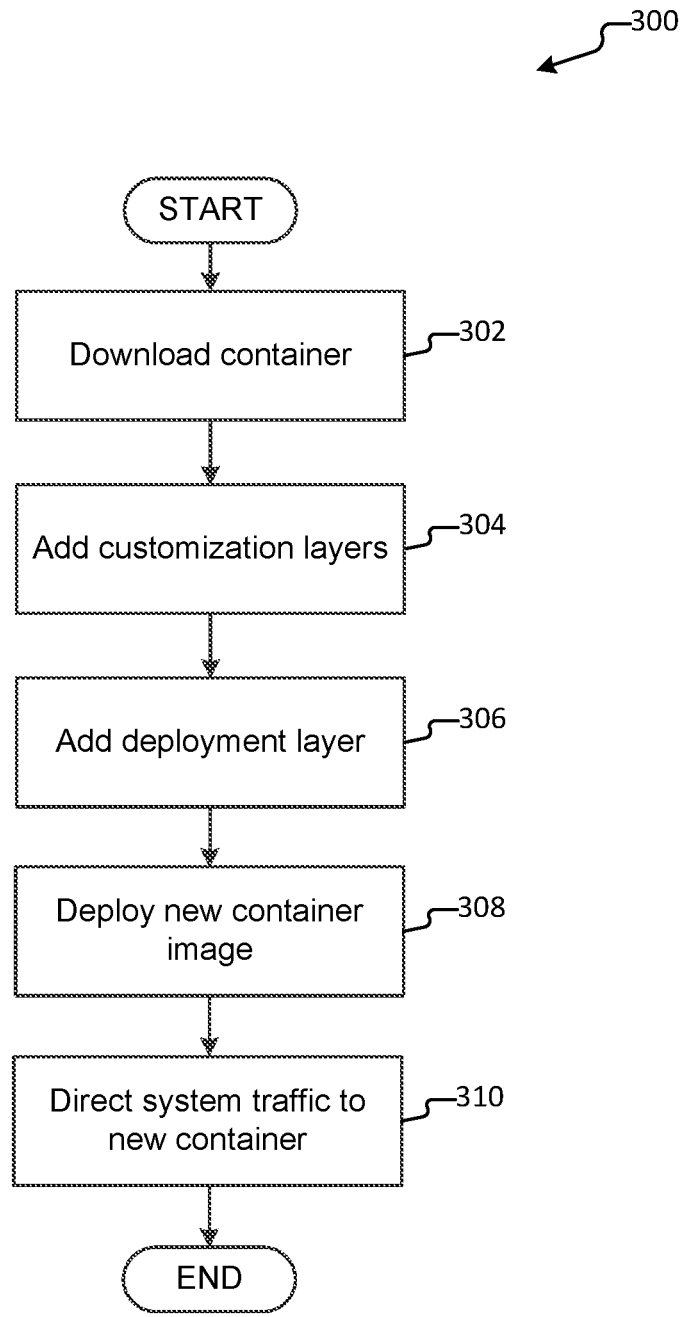
FIG. 4 illustrates a method for directing web traffic to a web page resource N, according to an example embodiment of the present disclosure.

FIG. 4 illustrates an example method 300 for directing traffic to a system resource version. The method 300 is described generally as being performed within the network arrangement 10 of FIGS. 1-2; however, it is recognized that the method 300 can be performed in various other embodiments or network arrangements as noted herein. The method 300 generally corresponds to a method of upgrading or updating system resources, for example to be used by users in both existing and new sessions, and which can be selected for deployment by the session version redirector 112.

As described herein, the session version redirector 112 directs traffic to an appropriate system resource version A 128 or system resource version B 130 based at least in part on the functions of container module 114, the customization module 116, the deployment module 118, and the rollback module 120, and all of which executes certain steps described herein.

As part of upgrades to a platform, a container is downloaded (step 302). An example of a container is an isolated, resource controlled, portable operating environment where a platform or application can run without affecting the rest of the platform, application, or the server hosting the platform or application. An example includes Windows Service Containers (WSC) provided by Microsoft Corporation of Redmond, Wash. The container has versionable resources that may be customized, added, or removed based on design preferences. The container that is downloaded represents a state of a system resource version A 128 and is still compatible with agnostic API 126. Furthermore, the previous container 114 is preserved during a side-by-side upgrade or in the event that traffic is directed back to it after a rollback, as will be described in further detail below.

Customization layers may be added (step 304) to the container. The customization layers may include any custom enterprise solutions, programs, functions, and applications on the platform 122. Customization layers may also include fixes and workarounds for bugs present in prior system resource versions. In an example embodiment, customization layers may include updates to security features, closing of security loopholes, removal of stability issues, or increasing the compatibility of the platform 122 with respect to additional third party programs or devices.

A deployment layer may be added (step 306) to the container. The deployment layer may include the location of the configuration databases. For example, the deployment layer may include information useable to deploy system resources to a new, known location within the network arrangement 10. The deployment layer may also include information that allows the session version redirector 112 to selectively route traffic to the specific deployed system resource version, information to create an offline boot environment to help restart client devices or servers, information to help provide IT teams with remote control of client devices 111 when updating to new system resource versions, or information to ensure either hardware resources and files are readily accessible by the session version redirector 112 in the event that a rollback or a full upgrade is pursued.

Once the container has both customization and deployment layers, the new container is deployed (step 308). The new container may be deployed to a plurality of locations including the platform enterprise 122, a client application 110, 108, a client or third party device 111, 109, or server 124 or any combination thereof.

Once the container is deployed to the appropriate location, traffic can now be directed to the new container (step 310). Users may experience the benefits of the new solutions, programs, features and functionality, and any other variety of upgrades. In one aspect, the session version redirector 112 allows traffic to be directed to a compatible, and in certain circumstances, newer and more updated system resource versions. Thus, the user can enjoy the most up-to-date experience with platform 122 and experiences the benefits that come with rapidly updated features and functionality.

Figure 5:
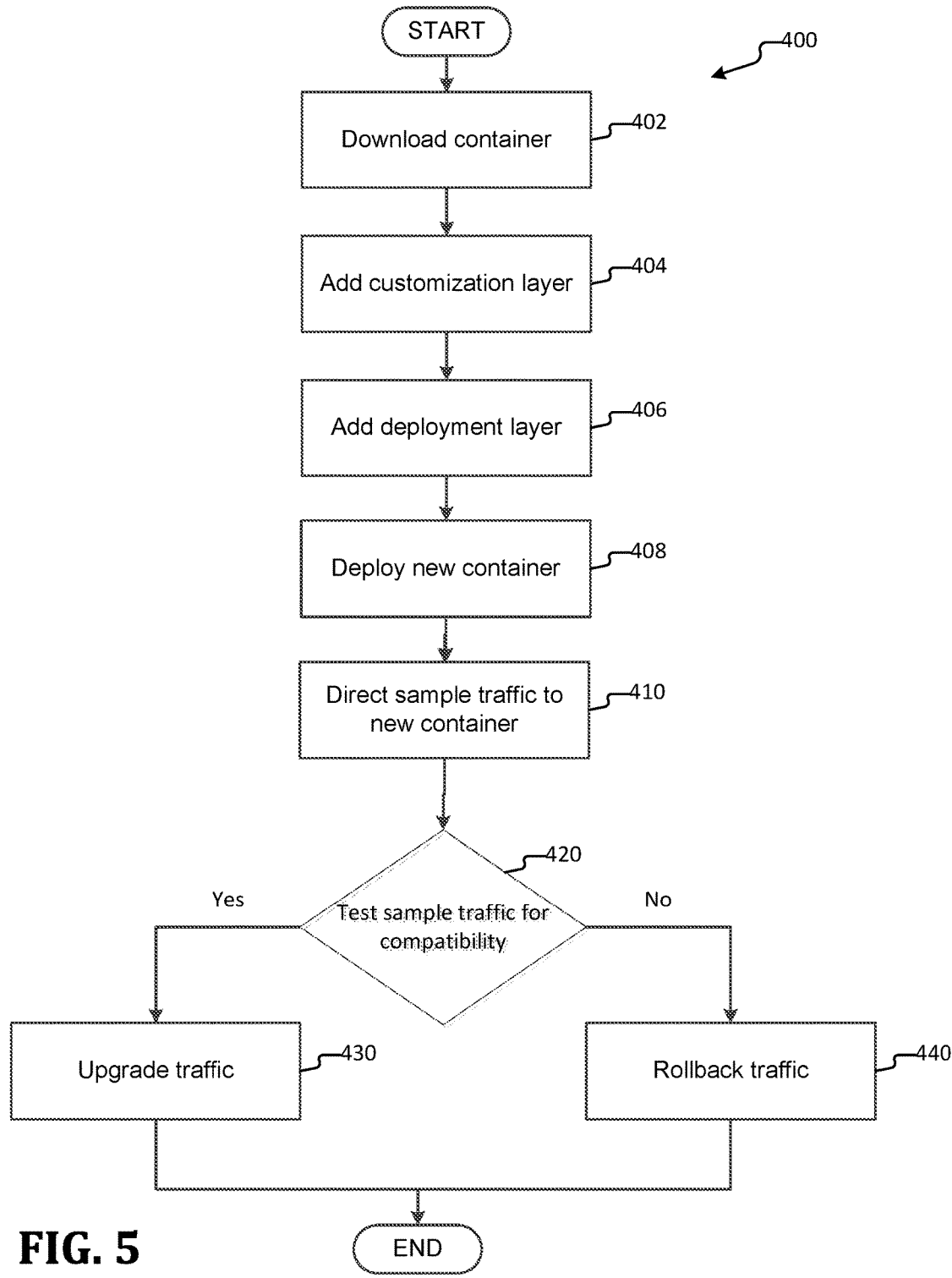
FIG. 5 illustrates a method for rolling back traffic, according to an example embodiment of the present disclosure.

FIG. 5 illustrates an example method for rolling back traffic or upgrading traffic. As described herein, the session version redirector 112 can roll back traffic if the platform of a system resource version is deemed unhealthy. Rolling back traffic to an appropriate system resource version is based at least in part on the functions of container module 114, the customization module 116, the deployment module 118, and the rollback module 120, and all of which executes certain steps described herein.

As part of upgrades to an enterprise platform, a container is downloaded (step 402). An example of a container is an isolated, resource controlled, portable operating environment where a platform or application can run without affecting the rest of the platform, application, or the server hosting the platform or application. An example includes Windows Service Containers (WSC) provided by Microsoft Corporation of Redmond, Wash. The container has versionable resources that may be customized, added, or removed based on design preferences. The container that is downloaded represents a state of a system resource version and is still compatible with an agnostic API. Furthermore, the container is preserved in the event the event that traffic is directed back to it after a rollback, as will be described in further detail below.

A customization layer may be added (step 404). The customization layers may include any custom enterprise solutions, programs, functions, and applications on the platform 122. Customization layers may also include fixes and workarounds for bugs present in prior system resource versions. In an example embodiment, customization layers may include updates to security features, closing of security loopholes, removal of stability issues, or increasing the compatibility of the platform 122 with respect to additional third party programs or devices.

A deployment layer may be added (step 406). The deployment layer may include the location of the configuration databases, and may be added either before or after addition of the customization later 404. For example, the deployment layer may include information useable to deploy system resources to a new, known location within the network arrangement 10. The deployment layer may also include information that allows the session version redirector 112 to selectively route traffic to the specific deployed system resource version, information to create an offline boot environment to help restart client devices or servers, information to help provide IT teams with remote control of client devices 111 when updating to new system resource versions, or information to ensure either hardware resources and files are readily accessible by the session version redirector 112 in the event that a rollback or a full upgrade is pursued.

Once the container has both customization and deployment layers, the new container is deployed (step 408). The new container may be deployed to a plurality of locations including the platform enterprise 122, a client application 110, 108, a client or third party device 111, 109, or server 124 or any combination thereof. A test, sample traffic can now test the new container (step 420) for potential bugs or issues such as those related to compatibility, security, stability etc. In one aspect, the test, sample traffic can be locked to the new system resource version. This sample traffic can be an administrator-defined subset of traffic used to test that new system resource version. In another aspect, the test, sample traffic (again, possibly an administrator-defined subset of traffic) may be restricted only to selected users that are capable of tolerating rapid, upgrades despite potential stability or security flaws. In other aspects, the test, sample traffic is reserved for select test users who are interested in experimenting with and giving feedback on features associated with new system resource versions.

If the test, sample traffic is deemed healthy either by positive user response or by the lack of issues, such as, for example security or stability issues, then the session version redirector 112 may initiate an upgrade path (step 430), which ultimately directs all traffic to the new system resource version B 130. The test traffic on the upgrade path have been deemed to a have passed a quality threshold and therefore, may allow the session version redirector 112 to direct all traffic to the newer, more updated system resource versions B 130. Thus, users on the upgrade path will enjoy an updated platform experience with the benefits that come with rapidly updated and customized feature and functionality.

If the test, sample traffic is deemed unhealthy either by negative user response or by the presence of issues, such as, for example security or stability issues, then the session version redirector 112 may direct all traffic to be part of a rollback path (step 440), which ultimately directs all traffic to an old system resource version. This rollback feature allows for users to retain the benefits of a working system resource version and minimizes the risk that long standing sessions are interrupted because of security or stability issues. By directing traffic back to a compatible system resource version, the session version redirector 112 allows users to preserve long running sessions without fear of interrupting sessions during side-by-side upgrades. Unhealthy or incompatible traffic is directed to a system resource version that minimizes the loss of crucial information and allows users to run their mission-critical infrastructure on established and stable platforms.

Figure 6:
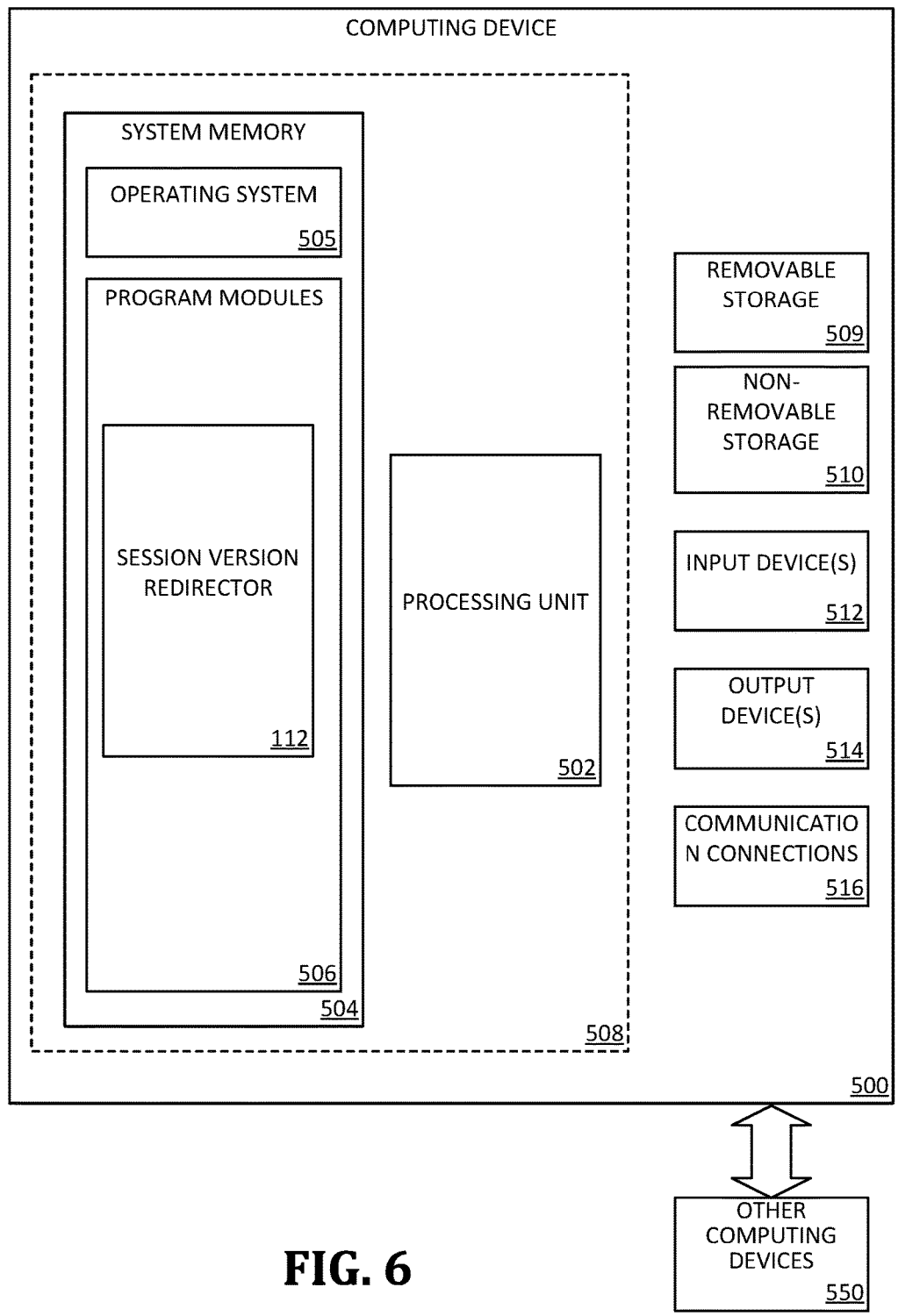
FIG. 6 is a block diagram illustrating example physical components of a computing device with which aspects of the disclosure may be practiced.

FIG. 6 is a block diagram illustrating an example physical component of computer device 500 with which aspects of the disclosure may be practiced. The computing device components described below may have computer executable instructions for implementing a session version redirector program 112 on a computing device (e.g. server 124), including computer executable instructions for the session version redirector program that can be executed to employ the methods disclosed herein. In an example configuration, the computing device 500 may have a processing unit 502 and a system memory 504. Depending on the configuration and type of computing device, the system memory 504 may comprise of volatile storage (e.g. random access memory, non-volatile storage (e.g. read-only memory), flash memory, or any combination of such memories. The system memory 504 may include an operating system 505 suitable for running the session version redirector program 112 or one or more components in regards to FIGS. 1, 2. The operating system 505, for example, may be suitable for controlling the operation of the computing device 500. Furthermore, embodiments of the disclosure may be practiced in conjunction with an enterprise suite library, other operating systems, or any other application program and is not limited to any particular application or system. This basic configuration is illustrated in FIG. 6 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 6 by a removable storage device 509 and a non-removable storage device 510.

As stated above, a number of program modules and data files may be stored in the system memory 504. While executing on the processing unit 502, the program modules 506 (e.g., session version redirector 112) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 400 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
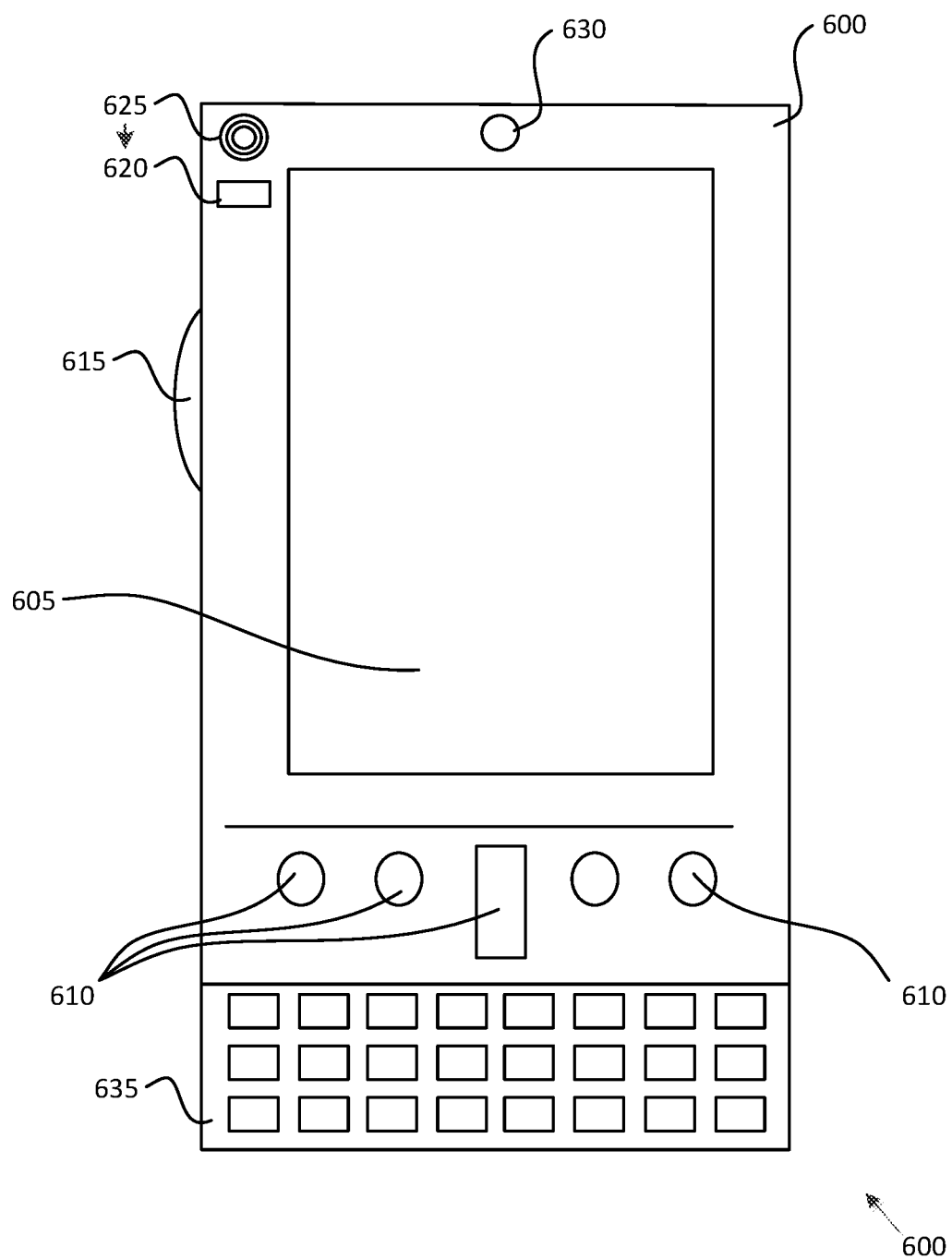
FIG. 7A and FIG. 7B are simplified block diagrams of a mobile computing device with which aspects of the present disclosure may be practiced.
Figure 7B:
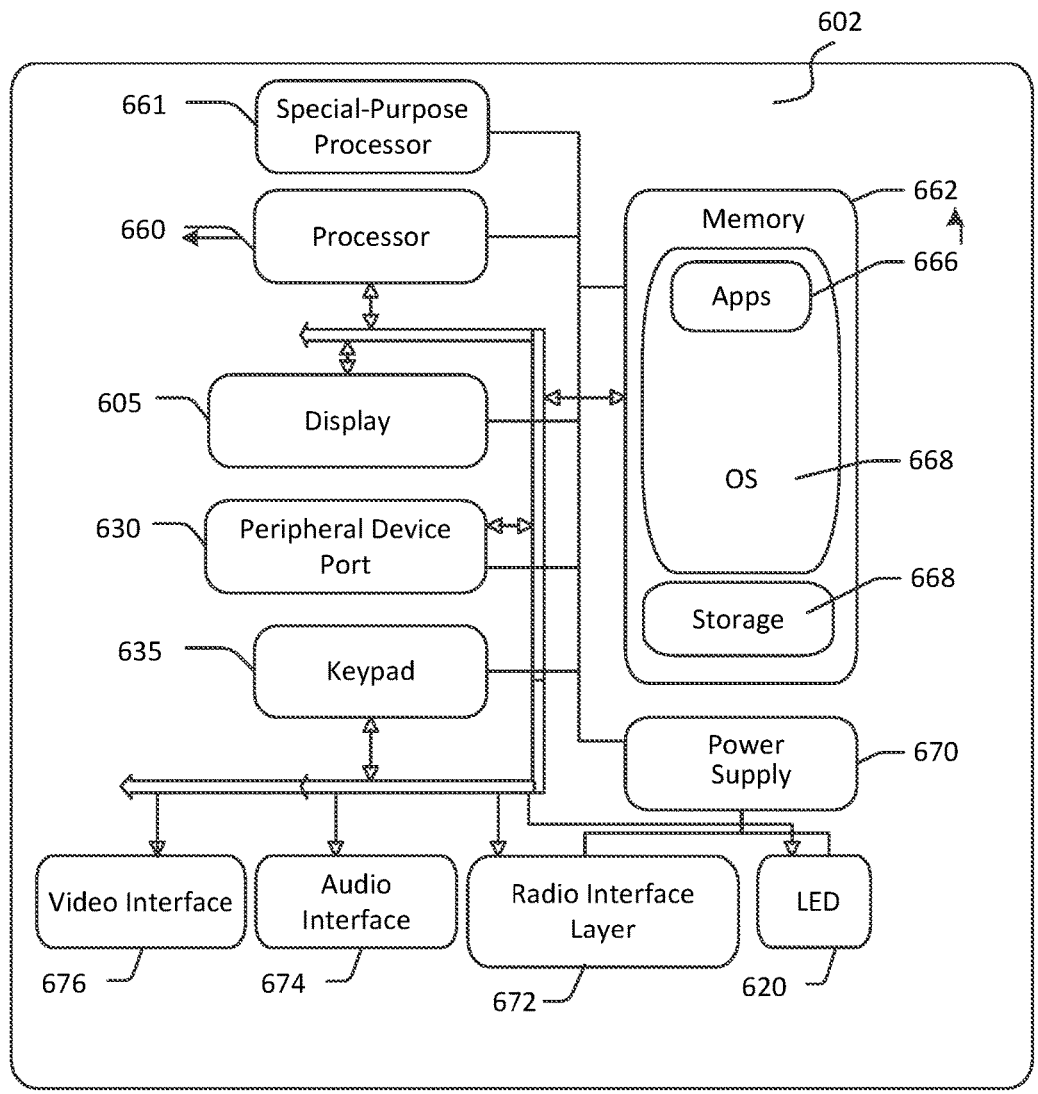

FIGS. 7A and 7B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 7A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). Interaction with the multitude of computing systems with which embodiments of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 568 within the memory 662. The non-volatile storage area 668 may be used to store persistent information that should not be lost if the system 602 is powered down. The application programs 566 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600, including the instructions for providing a session version redirector program.

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 7B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 8:
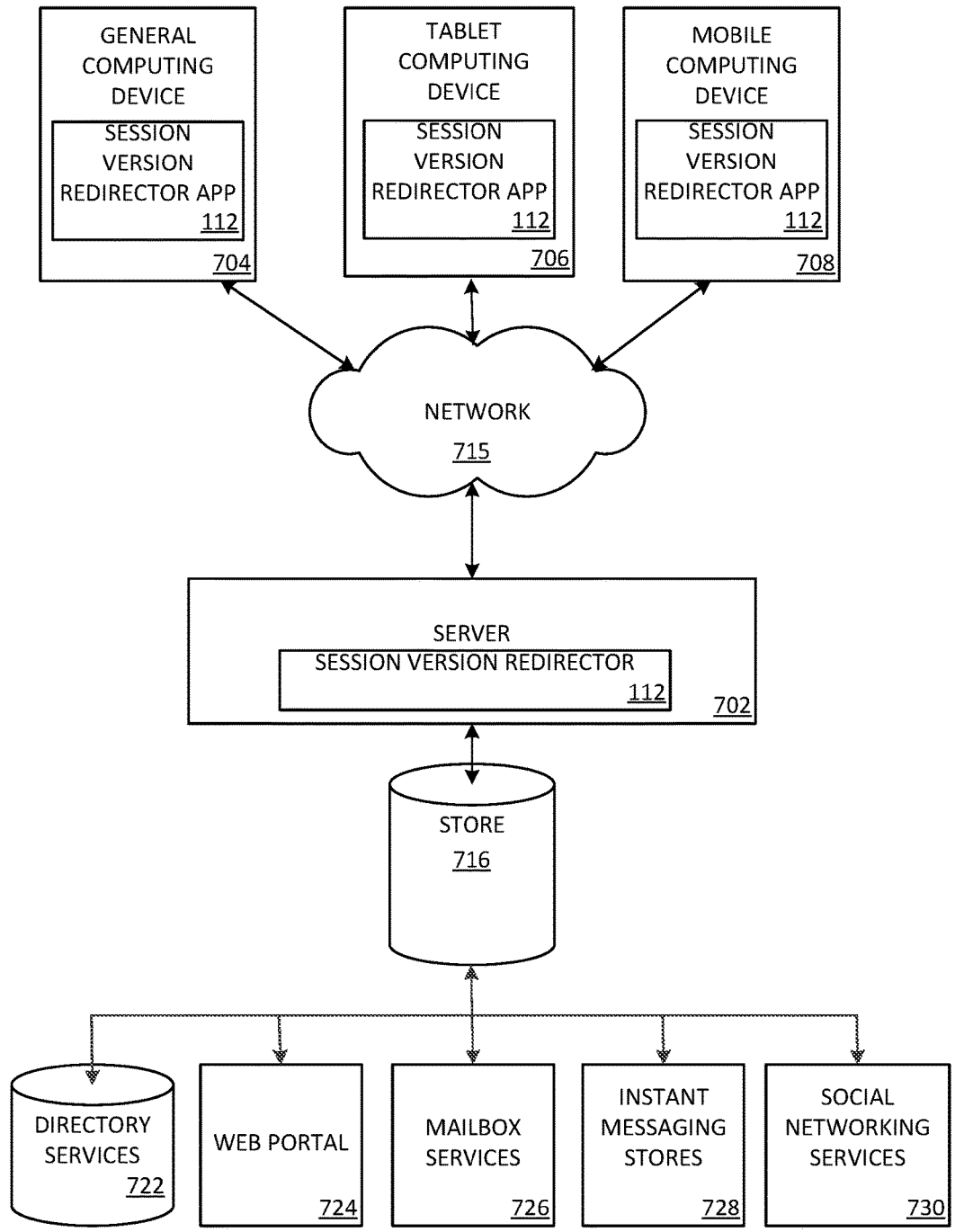
FIG. 8 is a simplified block diagram of a distributed computing system in which aspects of the present disclosure may be practiced.

FIG. 8 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. The session version redirector 112 may be employed by a client that communicates with server device 702, and/or the session version redirector may be employed by server device 702. The server device 602 may provide data to and from a client computing device such as a personal computer 704, a tablet computing device 706 and/or a mobile computing device 708 (e.g., a smart phone) through a network 715. By way of example, the computer system described above with respect to FIGS. 1-5 may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system. In yet another aspect, the server device 702 acts as session-based front-end server that accesses system resources from server 124, which may represent one or more servers hosting a plurality of different services. In example embodiments, the enterprise front-end server 702 can be SharePoint server-side services provided by Microsoft Corporation of Redmond, Wash.

Referring to FIGS. 1-8, it is noted that the version redirection features disclosed herein have a number of potential advantages in example aspects. For example, the session version redirector described herein can easily be directed by a client as to a preferred version of a system resource to be provided to that client by way of an identification of that version in a resource request, but the session version redirector can also be used to rollback to previous versions of a system resource by an administrator in the case of anomalous operation of new versions. Furthermore, the session version redirector may include rules that allow client users to identify whether they are in the midst of long-running sessions, and therefore would require previous resource versions to ensure correct continued operation. Other advantages are possible as well, and some or all of such advantages may be realized by one or more embodiments described herein.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A system for preserving running sessions during side-by-side upgrade, the system comprising:
 one or more processors;
 a memory coupled to the one or more processors, the memory storing a session preservation application comprising computer-executable instructions that, when executed by the one or more processors, causes the system to:
 deploy a first version and a second version of a system resource to a server within a network, wherein the first version and the second version of the system resource are both maintained within the system network and accessible via a version agnostic Application Programming Interface, the second version of the system resource being updated relative to the first version by integrating a customization layer to the first version of the system resource to create the second version of the system resource, wherein the customization layer includes a custom solution;
 add a deployment layer to the second version of the system resource, the deployment layer including a location within the system network;
 receive, at a front-end server, a request for interaction with the system resource from a first client system, the request from the first client system including a header including version-identifying information;
 determine, at a session version redirector and in response to receipt of the request at the front end server, that the client system should be provided the first version of the system resource and not the second version of the system resource based on the version-identifying information in the header; and
 in response to the request from the first client system, provide the first version of the system resource to the first client system.

2. The system of claim 1, wherein the header included in the request from the first client system indicates that the first client system has an existing session utilizing the first version of the system resource.

3. The system of claim 1, further comprising computer-executable instructions that cause the system to:
 receive, at the front-end server, a request from a second client system for interaction with the system resource, the request from the second client system;
 determine, at the system version redirector, that the second client system should be provided the second version of the system resource has no existing session associated with the first version of the system resource; and
 provide the second version of the system resource to the second client system.

4. The system of claim 1, further comprising computer-executable instructions that cause the system to:
 determine, at a session version redirector, that traffic is to be directed to either the first or second version of the system resource; and
 initiate use of the version agnostic API to perform an operation on the system resource.

5. The system of claim 4, wherein the version agnostic API is used to perform one or more operations on both the first version of the resource and the second version of the resource.

6. The system of claim 1, further comprising computer-executable instructions that cause the system to:
lock an administrator-defined subset of traffic to the second version of the system resource; and
analyze the compatibility of the traffic.

7. The system of claim 6, further comprising computer-executable instructions that cause the system to:
direct compatible traffic to the second version of the system resource; and
direct incompatible traffic to the first version of the system resource.

8. The system of claim 7, further comprising computer-executable instructions that cause the system to:
identify incompatible traffic, wherein the incompatible traffic exceeds a rollback threshold; and
upon identifying incompatible traffic exceeding the rollback threshold, direct all traffic to the first version of the system resource.

9. The system of claim 7, further comprising computer-executable instructions that cause the system to:
identify compatible traffic, wherein the compatible traffic exceeds an upgrade threshold; and
direct all traffic to the second version of the system resource.

10. A computer-implemented method for preserving running sessions during side-by-side upgrade, the method comprising:
receiving, at a front-end server, a first request from a client system for interaction with a system resource hosted at a server within a server network;
providing a first version of the system resource to the client system;
integrating a customization layer to the first version of the system resource to create a second version of the system resource, wherein the customization layer includes a custom solution;
adding a deployment layer to the second version of the system resource, the deployment layer including a location within the system network;
deploying the second version of the system resource to a server within the system network, such that the first version and the second version of the system resource are both maintained within the system network, the second version of the system resource being updated relative to the first version;
receiving, at the front-end server, a second request for interaction with the system resource from the client system, the request from the client system including a header including version-identifying information;
determining, at a session version redirector and in response to receipt of the request at the front end server, that the client system should be provided the first version of the system resource and not the second version of the system resource based on the version-identifying information in the header; and
in response to the request from the first client system, providing the first version of the system resource to the first client system.

11. The computer-implemented method of claim 10, further comprising
receiving, at the front-end server, a request from a second client system for interaction with the system resource;
determining, at the system version redirector, that the second client system has no existing session associated with the first version of the system resource; and
providing the second version of the system resource to the second client system.

12. The computer-implemented method of claim 11, wherein the request from the second client system is received prior to the second request from the first client system.

13. The computer-implemented method of claim 10, further comprising:
determining, at a session version redirector, that traffic is to be directed to either the first or second version of the system resource; and
initiating use of one or more APIs to perform an operation on either the first or second version of the system resource.

14. The computer-implemented method of claim 10, further comprising:
locking an administrator-defined subset of traffic to the second version of the system resource; and
analyzing compatibility of the traffic with the second version.

15. The computer-implemented method of claim 14, further comprising:
directing compatible traffic to the second version of the system resource; and
directing incompatible traffic to the first version of the system resource.

16. The computer-implemented method of claim 14, further comprising:
identifying a plurality of incompatible traffic, wherein the plurality of incompatible traffic exceeds a rollback threshold; and
directing all traffic to the first version of the system resource.

17. The computer-implemented method of claim 14, further comprising:
identifying a plurality of compatible traffic, wherein the plurality of compatible traffic exceeds an upgrade threshold; and
directing all traffic to the second version of the system resource.

18. A computer-readable storage memory encoded with computer-executable instructions that, when executed by a computer, cause the computer to:
receive, at a front-end server, a first request from a client system for interaction with a system resource hosted at a server within a server network;
provide a first version of the system resource to the client system;
deploy a second version of the system resource to a server within the system network, such that the first version and the second version of the system resource are both maintained within the system network, the second version of the system resource being updated relative to the first version;
receive, at the front end server, a second request for interaction with the system resource from the client system, the request from the client system including a header including version-identifying information;
determine, at a session version redirector and in response to receipt of the request at the front end server, that the client system has an existing session associated with the first version of the system resource;
determine, at the session version redirector, that the client system should be provided the first version of the system resource and not the second version of the system resource based on the version-identifying information in the header; and
in response to the second request, provide the first version of the system resource to the client system.

19. A computer-implemented method for preserving running sessions during side-by-side upgrade, the method comprising:
- receiving, at a front-end server, a first request from a client system for interaction with a system resource hosted at a server within a server network;
- providing a first version of the system resource to the client system;
- deploying a second version of the system resource to a server within the system network, such that the first version and the second version of the system resource are both maintained within the system network, the second version of the system resource being updated relative to the first version;
- receiving, at the front-end server, a second request for interaction with the system resource from the client system, the request from the client system including a header including version-identifying information;
- determining, at a session version redirector and in response to receipt of the request at the front end server, that the client system should be provided the first version of the system resource and not the second version of the system resource based on the version-identifying information in the header;
- in response to the request from the first client system, providing the first version of the system resource to the first client system;
- locking an administrator-defined subset of traffic to the second version of the system resource; and
- analyzing compatibility of the traffic with the second version.

* * * * *